United States Patent [19]
Chance

[11] Patent Number: 5,085,289
[45] Date of Patent: Feb. 4, 1992

[54] SHOCK-ABSORBING RESILIENT COUPLING

[76] Inventor: John H. Chance, Rte. #3, Hereford, Tex. 79045

[21] Appl. No.: 521,127

[22] Filed: May 2, 1990

Related U.S. Application Data

[60] Division of Ser. No. 243,060, Sep. 9, 1988, abandoned, which is a continuation-in-part of Ser. No. 935,038, Nov. 26, 1986, abandoned.

[51] Int. Cl.$^5$ .............................................. B60K 17/00
[52] U.S. Cl. ................................. 180/383; 180/344; 264/262; 464/89
[58] Field of Search ............... 180/344, 379, 380, 387, 180/383, 384; 464/88, 89, 90, 91; 264/262

[56] References Cited

U.S. PATENT DOCUMENTS

| | | | |
|---|---|---|---|
| 2,691,283 | 10/1954 | Stover | 180/383 |
| 3,859,821 | 1/1975 | Wallace | 464/89 |
| 4,033,020 | 7/1977 | Hudgens | 464/89 |
| 4,548,591 | 10/1985 | Haldric et al. | 464/89 |

*Primary Examiner*—Kenneth R. Rice
*Attorney, Agent, or Firm*—Hubbard, Thurman, Tucker & Harris

[57] ABSTRACT

A resilient, torque-transmitting coupling is utilized to coaxially interconnect driving and driven shafts. The coupling has a hollow outer member whose interior surface circumscribes an axis and has a square cross-section. An inner member having a slightly smaller square cross-section is axially received in the outer member and defines therein a square cross-sectioned cavity which laterally circumscribes the inner member. The cavity is filled with a resilient urethane material which is bonded to the laterally facing surfaces of the inner and outer coupling members. Corner portions of the inner member cooperate with the flat interior side surface portions of the outer member to limit relative axial rotation between the inner and outer members to thereby torsionally stress the urethane essentially entirely in tension and compression, and to prevent torsional "spin-out" between the inner and outer members. Because the urethane is bonded to each of the coupling members, its entire volume is efficiently utilized to resiliently resist relative displacement between the inner and outer coupling members. The coupling may be conveniently formed by pouring liquid urethane into the internal cavity and then suitably hardening and curing the urethane in place within the coupling. In one applicational embodiment, the coupling is incorporated in a replacement drive shaft section of a diesel truck drive train and functions to prolong the operating life of the drive train while at the same time significantly reducing the amount of drive train torsional shock and vibration transmitted to the driver of the truck.

44 Claims, 8 Drawing Sheets

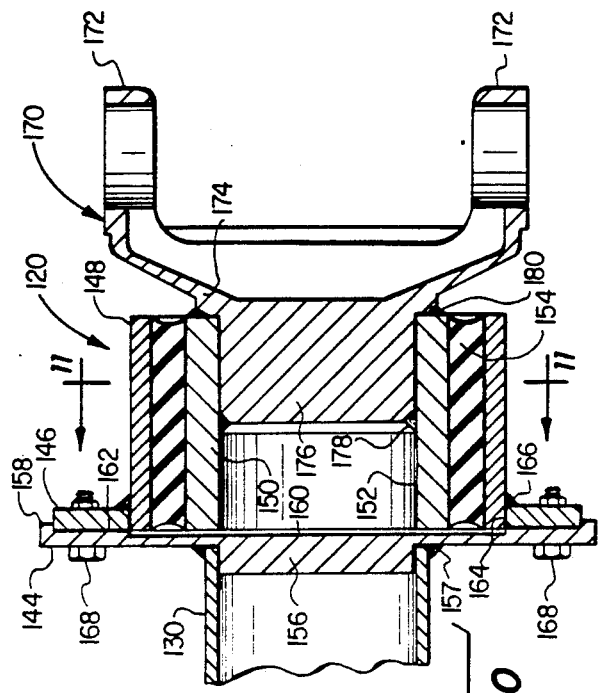
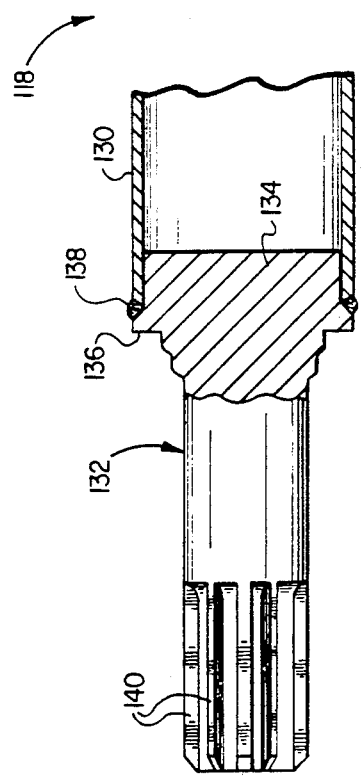
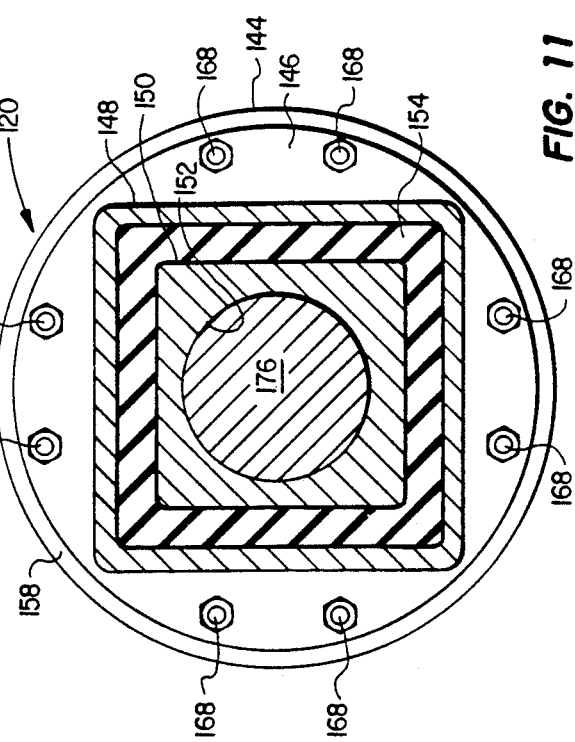
FIG. 10
FIG. 11

SHOCK-ABSORBING RESILIENT COUPLING

CROSS-REFERENCE TO RELATED APPLICATION

This application is a division of U.S. application Ser. No. 243,060, filed Sept. 9, 1988, now abandoned, which is a continuation-in-part of U.S. application Ser. No. 935,038 filed on Nov. 26, 1986, now abandoned.

BACKGROUND OF THE INVENTION

The present invention relates generally to coupling apparatus, and more particularly provides a uniquely configured shock-absorbing resilient coupling which is coaxially connectable between driving and driven shafts to transmit rotational power therebetween.

As exemplified in U.S. Pat. Nos. 1,701,470; 2,199,926; 2,712,742; 3,034,443; 3,466,869; and 3,859,821, a variety of coupling designs have heretofore been proposed for resiliently interconnecting driving and driven shafts to transmit rotational power therebetween. A common theme has been to provide a relatively flat resilient member, connect an end portion of one of the shafts to a central section of the resilient member, and connect an end portion of the other shaft to a peripheral portion of the resilient member. This connection utilizes torsional shear stress in the resilient member to provide for rotational flexure between the coupled shafts.

More specifically, when a torsional load is transmitted between the shafts (whether such load is a steady state torque or a transitory torsional shock), outer and inner portions of the resilient member are axially twisted relative to one another. While this relative twisting scheme is satisfactory in some shaft-coupling applications, in many high-torque situations the risk is present that a sudden torsional shock (or other unexpected torque load) can cause actual shearing of the resilient member, thereby creating a "spin-out" condition in the coupling a condition in which the resilient member is simply ripped apart, thereby eliminating the connection between the two shafts.

Various alternative coupling designs have been proposed to eliminate this shear-induced failure problem. One such design utilizes essentially circular coaxial inner and outer coupling members having overlapping radial tab portions thereon which define around the inner member an array of axially extending chambers. Resilient inserts are removable positioned in such chamber, between each pair of radial tabs, and are compressed by the tabs when the inner and outer coupling members are rotated relative to one another half of the inserts being compressed when the coupling members rotate in one direction relative to one another, the other inserts being compressed when the members are rotated in the other direction. This type of coupling is relatively expensive to manufacture and assemble. Moreover, since only half of the inserts are compressively stressed during relative rotation in a given sense between the two coupling members, this type of coupling configuration is notably inefficient as to its use of the internal resilient material. Further, couplings of this type typically can absorb only torsional forces, and cannot resiliently resist axially directed thrust loads.

It is accordingly an object of the present invention to provide a shock-absorbing resilient coupling which eliminates or substantially minimizes the above-mentioned and other problems and limitations typically associated with resilient torquetransmitting couplings of conventional construction and operation.

A representative torque transmission application in which torsional shock and vibration pose a variety of heretofore unsolved problems is in the drive train of large diesel-powered trucks in which a powerful, high compression diesel engine operates through a manual transmission to drive a differential system connected to the transmission by an elongated drive shaft having a universal joint at its differential driving end. This conventional drive train system typically incorporated in large trucks generates considerable torsional shock and vibration along its length due to the essentially rigid torsional interconnection between the diesel engine and the differential. The torsional shock and vibration not only significantly shorten the lives of various drive train components, but is also transmitted to the truck cab to an extent that can rapidly cause driver fatigue.

A conventional approach to reducing the amount of drive train shock and vibration transmitted to the driver has been to provide truck cabs with rather elaborate and expensive air suspension systems designed to isolate the driver from such shock and vibration. This, of course, does not eliminate torsional drive train shock and vibration, and its life-shortening effects on drive train components. It merely forms a shock and vibration absorbing buffer between the driver and the drive train.

Various attempts have heretofore been made to incorporate a resilient link into the otherwise essentially rigid (from a torque transmission standpoint) drive train of a motor vehicle to torsionally "soften" the transmission-differential interconnection. Illustrative of this resilient link approach is U.S. Pat. No. 1,906,057 to Guy in which the normal yoke-type universal joint is replaced with a resilient universal joint formed from a metal sheathed rubber element press-fitted between overlapping driving and driven shaft end portions. As another example, a resilient coupling employing an annular rubber member captively retained between inner and outer cup-shaped members is secured to a universal joint yoke in the resilient universal joint structure illustrated and described in U.S. Pat. No. 2,949,021 to Charlesworth.

While these and similar conventional rubber-based coupling components indeed add resiliency to a motor vehicle drive train, they simply do not have the strength and longevity to function satisfactorily in a diesel truck application with its widely diverging torque and speed characteristics. It is accordingly a further object of the present invention to provide more durable shock-absorbing resilient coupling apparatus which may be incorporated into the drive train of a diesel truck to significantly reduce drive train shock and vibration transmitted to the driver, and to prolong the operating life of various other drive train components.

SUMMARY OF THE INVENTION

The present invention provides a resilient, shockabsorbing coupling which comprises inner and outer members coaxially connectable to driving and driven shafts, and a resilient portion disposed between and bonded to the facing surfaces of the coupling members. The outer and inner coupling members uniquely cooperate with one another to limit relative rotation therebetween, and to essentially limit the torsion-induced stress on the resilient coupling portion to that of tension and compression, thereby eliminating the problem of sheat stressinduced torsional coupling "spin-out".

Since the resilient portion is bonded to the inner and outer coupling members, the entire volume of the resilient material is efficiently utilized to resiliently resist torsional displacement between the inner and outer coupling members. The resilient portion additionally provides resilient resistance to axial displacement and misalignment between the inner and outer coupling members.

In a preferred embodiment of the coupling of the present invention the outer member is hollow and has an essentially square interior surface cross-section which circumscribes an axis, and the inner member has a somewhat smaller, essentially square cross-section and extends axially into the outer member so that the flat exterior and interior side surface portions of the inner and outer members are in a facing, parallel and spaced relationship. The inner and outer members define therebetween a square cross-sectioned cavity which laterally circumscribes the inner member. The resilient portion of the coupling comprises a flowable, yet essentially incompressable urethane material which may be conveniently poured into the cavity, during fabrication of the coupling, and then hardened and cured within the cavity.

The inner and outer members are relatively configured and positioned so that the axially extending corner portions of the inner member cooperate with the flat interior side surface portions of the outer member to limit the amount of potential relative axial rotation between the inner and outer members, thereby precluding torsional "spin-out". The facing flat side surface portions of the two coupling members cooperate to maintain essentially the entire volume of the cavity-disposed urethane material under tensile and compressive stress when axial torque is being transmitted between the inner and outer members via the urethane material.

Compared to couplings of conventional construction, the coupling of the present invention provides several distinct advantages. First, its simple construction renders it easy and relatively inexpensive to manufacture. In fact, if desired, the inner and outer coupling members may be respectively formed from lengths o standard sized square steel bar stock and thick walled square tube. Additionally, the coupling uniquely solves the problem of torsional spin-out and the shearing of its resilient component. Further, it efficiently utilizes the entire volume of its resilient component to resiliently resist relative displacements between its inner and outer members and the shafts to which they may be connected.

According to a feature of the invention, the axial stiffness of the coupling may be increased by forming on the interior surface of the outer coupling member an internal rib which laterally circumscribes the inner coupling and is axially aligned with an exterior surface groove formed therein. The rib and groove collectively define therebetween a laterally offset portion of the urethane which resists relative axial movement between the rib and groove to thereby axially stiffen the coupling.

In an alternate embodiment of the coupling one or both of its inner and outer members are formed from intersecured laminae cut from a thick steel plate. This laminated construction allows the lateral thickness of the internal coupling cavity to be precisely dimensioned, such thickness not being limited to the increments thereof available using standard steel bar stock and tube sections. This laminated construction technique also permits the internal axial stiffening rib to actually project into the lateral groove to provide the coupling with greatly increased axial stiffness.

In a preferred applicational embodiment thereof, the coupling is incorporated in a replacement drive shaft section of a diesel truck drive train and functions to prolong the operating life of the drive train while at the same time significantly reducing the amount of drive train torsional shock and vibration transmitted to the driver of the truck.

The replacement drive shaft section comprises first and second subassemblies. The first subassembly includes a tubular drive shaft member having a splined slip tube shaft welded to one of its ends, and a first mounting flange welded to its opposite end. The second subassembly includes a resilient, shockabsorbing coupling of the present invention having a second mounting flange welded to a front end portion of the outer coupling member, and a differential joint yoke arm welded to a rear end portion of the inner coupling member. To form the replacement drive shaft section assembly, the first and second subassemblies are joined by bolting the second mounting flange to the first mounting flange.

In constructing the drive shaft section assembly, the first subassembly is formed as described above, and is then rotationally balanced by removing material from appropriate locations on the first mounting flange. The second subassembly is formed by welding the second mounting flange to the outer coupling member, welding the yoke arm to the inner coupling member, and then coaxially disposing the inner coupling member within the outer coupling member to form the square cross-sectioned coupling cavity that laterally circumscribes the inner coupling member. The resilient urethane material is then flowed into the cavity and is solidified, cured and bonded to the facing side surfaces of the rigid coupling members as previously described. The second subassembly is then bolted to the first subassembly and the resulting drive shaft section assembly is rotationally balanced.

According to a further aspect of the present invention, precise axial alignment between the aforementioned first and second subassemblies using a specially designed alignment and sealing device which precisely positions and aligns the inner and outer coupling members prior to the pouring of the urethane in the cavity therebetween. In a preferred embodiment thereof the device comprises an alignment plate with four threaded openings formed transversely therethrough in a mutually spaced relationship. Vertically movable alignment balls are positioned in upper portions of the openings, project upwardly beyond the upper side surface of the plate, and are vertically adjustable by small set screws received in the openings and supporting the balls.

The upwardly projecting ball portions, after appropriate vertical adjustment thereof, are received in alignment dimples formed in a side surface of the flange previously welded to the outer coupling member, and in the end surface of the inner coupling member opposite the end to which the yoke member is welded, when the flange and the inner coupling member are rested upon the flat upper surface of the plate. Prior to this positioning of the inner coupling member, and the outer coupling member flange, on the upper plate surface of the flange side surface and the inner coupling member end surface are machined precisely perpendicular to the flange axis and the inner coupling member axis.

Accordingly, when the flange and inner coupling member are rested atop the upper plate surface, and the alignment balls are received in their corresponding alignment dimples, the axes of the inner and outer coupling members are precisely aligned and the coupling members are also precisely laterally aligned so that the urethane may be poured into the coupling cavity. The surface interface between the upper plate surface and the downwardly facing inner coupling member end surface and flange side surface forms a seal around the lower end of the coupling cavity to prevent urethane leakage therefrom during the pouring and hardening process.

The precisely aligned second subassembly formed in this manner is then bolted to the previously balanced first subassembly and the resulting replacement drive shaft section is balanced as previously described.

The balanced drive shaft section assembly is relatively inexpensive to fabricate, and may be quickly installed in place of a conventional, rotationally rigid drive shaft section which rotationally couples the transmission output shaft and the differential input shaft in a diesel truck.

BRIEF DESCRIPTION OF THE DRAWINGS

FIG. 3 is a cross-sectional view taken through the coupling along line 3—3 of FIG. 1;

FIG. 10 is an enlarged scale, longitudinally foreshortened and fragmentary cross-sectional view through the drive shaft section taken along line 10—10 of FIG. 9;

FIG. 11 is a cross-sectional view through the resilient coupling taken along line 11—11 of FIG. 10;

DETAILED DESCRIPTION

Figure 1:
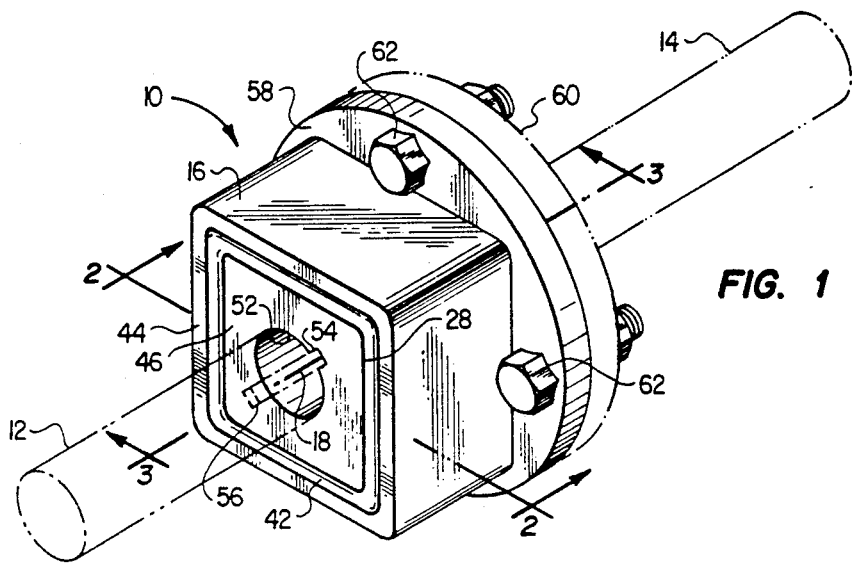
FIG. 1 is a perspective view of a shock-absorbing resilient coupling which embodies principles of the present invention and is utilized to rotationally couple driving and driven power transmission shafts illustrated in phantom in FIG. 1.

Perspectively illustrated in FIG. 1 is a shock-absorbing resilient coupling 10 which embodies principles of the present invention and is utilized to interconnect and transmit rotational power between a driving shaft 12 and a driven shaft 14. The coupling 10 is particularly well adapted to low speed-high torque applications and is uniquely constructed to very efficiently absorb and damp shock loads imposed on either of the two shafts by driving and/or driven apparatus which may be operatively connected thereto.

Figure 2:
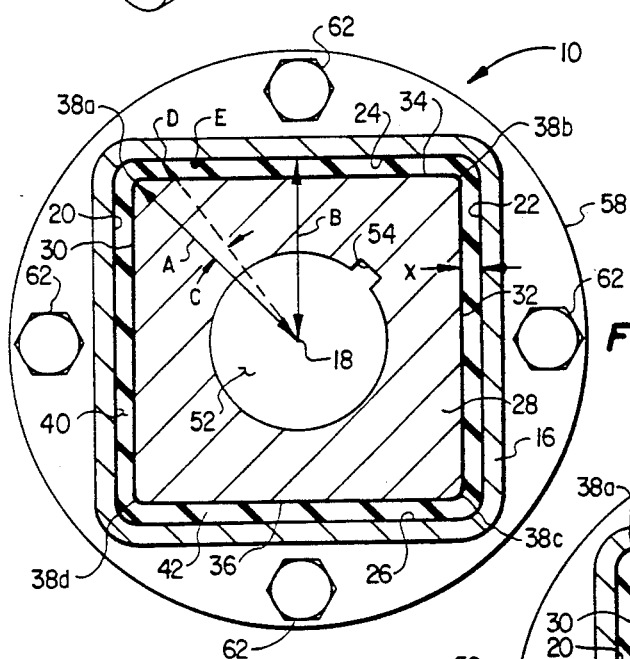
FIG. 2 is an enlarged scale cross-sectional view through the coupling, taken along line 2—2 of FIG. 1, and illustrates the relative positions of its components in the absence of torque being applied to the coupling.
Figure 3:
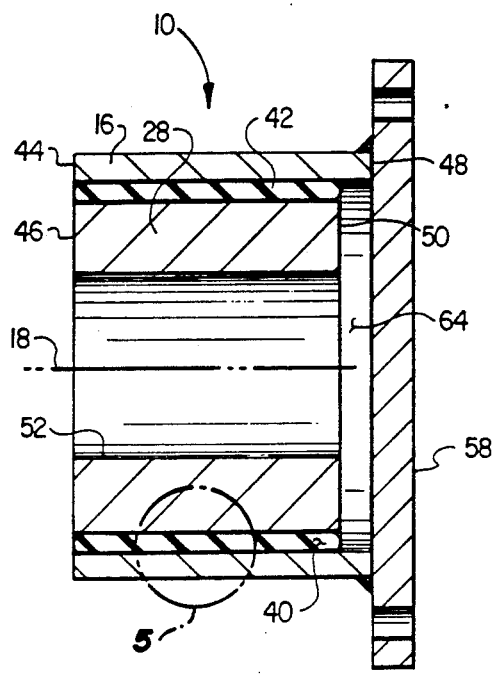
FIG. 3 is a cross-sectional view through the coupling similar to that depicted in FIG. 2 but illustrating the relative positions of the coupling components when the coupling is transmitting torque between the two shafts.

Referring now to FIGS. 1-3, the coupling 10 comprises a hollow, metal outer member 16 which circumscribes an axis 18 and has, along its length, an essentially square cross-section. The square interior surface of the outer member 16 is defined by essentially flat left and right side surface portions 20 and 22, and essentially flat upper and lower side surface portions 24 and 26. The coupling further includes an essentially square cross-sectioned metal inner member 28 which is coaxially disposed within the outer member 16 and has an exterior side surface defined by essentially flat left and right side sections 30 and 32, and essentially flat upper and lower side sections 34 and 36. These exterior side surface sections are interconnected by four slightly rounded corner portions 38$_a$, 38$_b$, 38$_c$ and 38$_d$ of the inner member 28.

The inner member 28 is cross-sectionally smaller than the interior cross-section of outer member 16, and is oriented therein so that with the coupling 10 being in an unflexed condition the exterior side surface sections 30, 32, 34 and 36 are respectively parallel to and positioned laterally inwardly from the interior side surfaces 20, 22, 24 and 26. The facing interior and exterior side surfaces of the outer and inner members 16, 28 define within the coupling 10 a cavity 40 which laterally circumscribes the inner member 28 and is filled with urethane 42 that is bonded to the laterally facing coupling member side surfaces around their entire peripheries. The left or front ends 44, 46 of the outer and inner members 16, 28 are essentially flush with each other, while the rear end 48 of the outer member 16 extends slightly rearwardly or rightwardly of the rear end 50 of the inner member 28 (see FIG. 3).

To mount the driving shaft 12 to the coupling 10, a circular bore 52 is extended axially through the inner member 28 and is provided with a radially projecting key slot 54. An inner end portion of the shaft 12 is inserted into the bore 52 and has suitably secured thereto a key member 56 which is received in the slot 54, thereby rotationally locking the shaft 12 to the inner member 28. The shaft 12 is also axially locked to the inner member 28 by conventional set screw means (not illustrated). To operatively secure the driven shaft 14 to the coupling 10, an annular mounting flange 58 is welded to the rear end 48 of the outer member 16. The inner end of the driven shaft 14 is suitably secured to a mounting flange 60 which is in turn secured to the mounting flange 58 as by bolts 62. As illustrated in FIG. 3, the mounting flange 58 defines with the rear ends of the inner member 28 and the filler material 42 a square cross-sectioned end cavity 64 within the outer member 16.

The coupling 10 is conveniently fabricated in the following manner. After the outer member 16 as been welded to the mounting flange 58 as previously described, the interior side surface of the outer member 16 and the exterior surface of the inner member 28 are cleaned and degreased using a suitable solvent, a bonding compound is applied to the cleaned and degreased side surfaces, and the two members are heated to approximately 100° C. With the inner member 28 held in proper orientation within the outer member 16, and with the cavity 40 extending vertically, liquid urethane is poured into the cavity, the lower end of the cavity being temporarily sealed in a suitable manner (not illustrated) to retain the urethane in the cavity until the urethane solidifies. The inner and outer members and the urethane therebetween are then subjected to a curing temperature of approximately 100° C. for approximately sixteen hours.

As will now be described, the outer and inner members 16 and 28, and the urethane filler 42 bonded thereto, uniquely cooperate to absorb and damp torsional shock imposed on either of the shafts 12, 14 to thereby protect each of the shafts and equipment to which they may be operatively connected and transmitting rotational power between. Referring to FIG. 2, in which the coupling 10 is cross-sectionally illustrated in its unflexed state, it should be first noted that the inner member 28 is cross-sectionally dimensioned relative to the inner periphery of the outer member 16 so that the diagonal distance A between the axis 18 and each of the inner member corner portions 38 (corner portion $38_a$ being used as an example) is larger than the distance B between the axis 18 and each of the interior side surfaces of the outer member 16 (the upper interior side surface 24 being used as an example), the distance B being measured along a line perpendicular to the particular interior side surface.

Because of this important configurational aspect of the present invention, the corner portions 38 act as rotational stops to limit the potential rotation of the inner member 28 relative to the outer member 16 about the axis 18. More specifically, it can be seen in FIG. 2 that if the outer member 16 were held stationary, and the inner member rotated in a clockwise direction about the central axis 18, the upper left corner portion $38_a$ of the inner member would (in the absence of the urethane filler 42) contact the upper interior surface 24 of the outer member at point D thereon. In a similar manner, each of the other three corner portions $38_b$, $38_c$, $38_d$ of the inner member would, at the same time, contact the other outer member interior surfaces 22, 26, 20 at corresponding locations thereon to thereby preclude further clockwise rotation of the inner member 28 relative to the outer member 16 about the axis 18.

Such cooperation between the inner member corner portions and the flat interior side surfaces of the outer member 16 accordingly limits the potential relative rotation between the inner and outer members to an angle C as illustrated in FIG. 2. This same cooperative interaction would also occur, of course, if the inner member were rotated in a counterclockwise direction relative to the outer member, in which case the upper left corner portion $38_a$ could move only through an arc C until it was stopped by the interior side surface 20 of the outer member 16 at the same time the other corner portions 38 were stopped by the other interior side surfaces of the outer member. This limited available relative rotation between the inner and outer members of the coupling is resiliently resisted by the urethane filler material 42 disposed within and bonded to the interior surfaces of the cavity 40, the filler material having an essentially uniform lateral thickness X when the coupling is in its unflexed condition as depicted in FIG. 2.

Figure 2A:
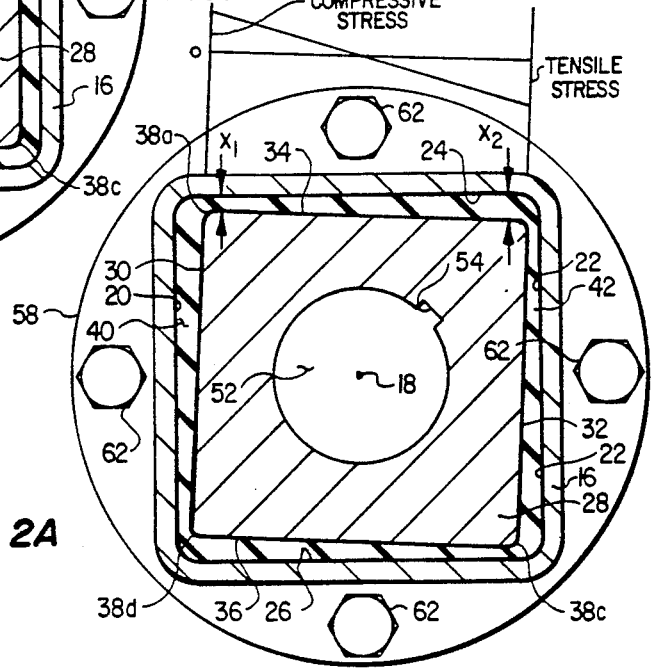

Referring now to FIG. 2A, which cross-sectionally illustrates the coupling 10 in a flexed condition which could occur during conjoint clockwise rotation of the shafts 12 and 14, it can be seen that the inner member 28 has been rotated through a portion of its available clockwise arc C relative to the outer member 16. Accordingly, each of the inner member exterior surfaces 30, 32, 34 and 36 has been shifted away from its previously parallel relationship with one of the flat interior side surface portions of the outer member, so that for each flat exterior side surface of the inner member, one of its corner portions 38 is moved closer to the facing interior surface, while the other corner portion 38 is moved further away from such facing interior surface.

Using the inner member exterior surface 34 as an example, it can be seen that corner portion $38_a$ is moved vertically closer to the interior surface 24, while the corner portion $38_b$ is moved vertically further away from such interior surface 24. This, in turn, reduces the lateral thickness of the urethane filler from X to $X_1$ adjacent the juncture of exterior surface 34 and corner portion $38_a$, and increases the filler thickness from X to $X_2$ adjacent the juncture of exterior surface 34 and the corner portion $38_b$. This configurational alteration additionally occurs between the other three facing sets of interior and exterior side surfaces of the inner and outer coupling members.

An important result arising from these geometrical relationships between the inner and outer members is that during torsional flexure of the coupling 10 stress in the urethane filler material 42 is essentially limited to compressive and tensile stress. Only a relatively small amount of shear stress is imposed on the urethane filler. Using the upper horizontal portion of the urethane filler as an example, it can be seen from the simple graph incorporated into FIG. 2A that adjacent the juncture of exterior surface 34 and the inner member corner portion 38$_a$, the urethane is stressed at a maximum compressive level, while at the juncture of surface 34 and corner portion 38$_b$ it is subjected to a maximum tensile stress. Between the corner portions 38$_a$, 38$_b$ the stress on the urethane filler 42 varies in an essentially linear fashion between these compressive and tensile stress maximums as indicated.

Further clockwise rotation of the inner member 28 relative to the outer member 16 (caused, for example, by a torsional shock imposed on the coupling 10 by the output shaft 14) will be resiliently resisted by the urethane filler, along all four sides thereof, with the maximum compressive and tensile stress levels in the urethane being increased.

It is important to note that because of the relative positioning and configuration of the outer and inner members 16 and 28, which limit their potential relative rotation about the axis 18, the possibility of "spin out" between the inner and outer members (a condition in which the resilient filler is simply sheared between the inner and outer members, permitting them to freely rotate relative to one another) is essentially eliminated. The internal rotation-limiting feature of the coupling 10 avoids this shear-related problem by uniquely maintaining the urethane filler in a state of compressive and tensile stress during transmission of torque between the shafts 12 and 14 without creating a significant level of shear stress in the urethane. Additionally, because the urethane is bonded to the facing interior and exterior surfaces of the outer and inner members around their entire peripheries, the entire volume of the urethane is advantageously utilized to absorb and damp torsional shocks imposed on either of the two coupled shafts.

The torsional resiliency of the coupling 10 is dependant upon three primary variables associated with the urethane filler 42-its hardness (i.e., its durometer value), its lateral thickness X, and its axial length. By varying one or more of these characteristics of the urethane filler, the coupling 10 may be easily designed and fabricated to meet a wide variety of torque-transmitting requirements.

As an example, with reference to FIG. 2, it can be seen that if the lateral thickness X of the urethane filler element 42 was slightly increased (i.e., by slightly reducing the cross-sectional area of the inner member 28 or increasing the interior cross-sectional area of the outer member 16) the overall volume of the urethane would be increased, thereby increasing the torsional resiliency of the coupling 10. This increase in the lateral thickness X would also permit a greater amount of relative rotation between the inner and outer members about the axis 18. Specifically, the contact point between the corner portion 38$_a$ and the interior side surface 24 would be shifted rightwardly along surface 24 to point E, the other corner contact points along the other interior surfaces of the outer member 16 being correspondingly shifted. In a similar manner, if the lateral thickness X was slightly reduced, the contact point D would be shifted leftwardly along the interior side surface 24.

In each of these examples, the inner member corner portions 38 would still cooperate with the flat interior side surface portions of the outer member 16 to preclude further rotation of the inner member 28 relative to the outer member 16, thereby preventing the possibility of coupling "spin-out" and maintaining the urethane filler element in a state of compressive and tensile stress without large amounts of shear stress therein.

It can readily be seen that as the contact point D is shifted rightwardly along interior surface 24, (i.e., as the diagonal distance A is decreased) it would approach a point at which the corner portions 38 may slip past the flat interior side surface portions of the outer member 16. While it is preferable to avoid this occurrence, and to utilize the corner portions 38 as "stops" to positively limit relative rotation between the inner and outer members, it may be satisfactory in some applications of the coupling 10 if the corner portions 38 do not actually function as mechanical stops, but are movable into at least a very close proximity to the interior surface of the outer member 16. In such instance, the dimension A would be only very slightly smaller than dimension B.

Thus far, the operational description of the coupling 10 has been limited to its torque-absorbing capabilities. However, the coupling is also capable of absorbing axial shocks and compensating for at least a limited degree of axial misalignment between the shafts 12, 14 which it interconnects. It can be seen in FIG. 3 that relative axial displacement between the outer and inner coupling members 16, 28 will be resiliently resisted by the urethane filler 42 which is placed in a shear stress condition during such relative axial displacement. The end cavity 64 serves as an internal clearance area when the axial displacement is such that the inner member 28 is moved closer to the flange 58. The urethane filler 42 also resiliently permits at least a limited lateral displacement between the axes of shafts 12, 14 as well as angular misalignment therebetween.

Figure 5:
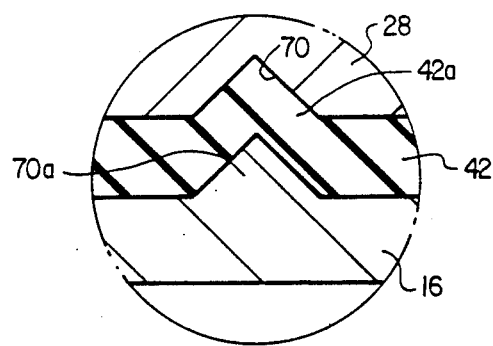
FIG. 5 is an enlargement of the circled area "5" of FIG. 3 and illustrates an interior modification of the coupling depicted in FIG. 3.

As just mentioned, during end-to-end axial displacement between the shafts 12, 14 the urethane filler is placed in an axial shear stress condition. As illustrated in FIG. 5, the axial resiliency of the coupling 10 may be stiffened, however, by the provision of a V-shaped lateral groove 70 around the periphery of the inner member 28 and a complementarily cross-sectioned rib 70A which extends laterally around the inner periphery of the outer member 16 and is axially aligned with the groove 70. Rib 70$_a$ may be formed integrally with outer member 16, or formed separately and fixedly secured thereto, as by welding. The groove and rib 70, 70$_a$ collectively define in the urethane filler 42 a laterally inset portion 42$_a$ which is subjected to compressive and tensile stress by relative axial movement between the facing surfaces of the groove and rib, thereby axially stiffening the coupling 10.

Figure 4:
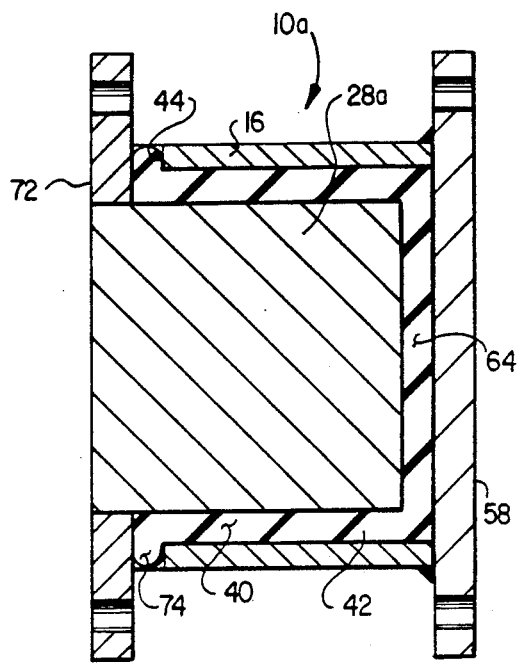
FIG. 4 is a cross-sectional view through an alternate embodiment of the coupling.

It is important to note that the shafts 12, 14 could be connected to the coupling 10 in a variety of manners other than the representatively illustrated keyed bore 52 and mounting flange 58. For example, each of the shafts could be keyed or splined to the inner and outer couplings, thereby eliminating the need for the flange 58. Alternatively, as depicted in FIG. 4, a modified version 10$_a$ of the coupling 10 could be constructed which utilizes two connection flanges-the flange 58 connected to the outer member 16, and a flange 72 secured to the left end of the inner member 28$_a$. Because of the use of flange 72, the bore 52 is omitted from the inner member 28$_a$ of coupling 10$_a$. Moreover, to provide axial clearance between flange 72 and the end 44 of outer member 16, the inner member 28$_a$ is made slightly longer than member 28 so that it projects outwardly through the left end of outer member 16. This creates a clearance gap 74 between the flange 72 and the end surface 44 as illustrated in FIG. 4.

While the urethane filler 42 in the coupling $10_a$ could be formed so that it fills only the cavity 40, and is thus positioned between and bonded only to the laterally facing surfaces of coupling members 16 and $28_a$, it can also be extended (during the urethane filling step) into the end cavity 64 and into the clearance gap 74 and bonded to all of interior surfaces of the coupling $10_a$. In this manner, portions of the urethane 42 (i.e., those portions in the cavity 64 and the clearance gap 74) are subjected to compressive stress when member $28_a$ is moved axially closer to flange 58, and to tensile stress when member $28_a$ is moved axially away from flange 58, thereby axially stiffening the coupling $10_a$.

A variety of other modifications could be made to the coupling 10 if desired. For example, while the cross-sections of the inner member 28 and the interior of the outer member 16 are preferably of an essentially square configuration, other convex polygonal cross-sectional configurations (such as triangular or pentagonal) could also be used. In such alternate cross-sectional embodiments of the coupling the corner portions of the inner member would be positioned to similarly function as rotational stops within the outer member, or at least be capable of being rotated into very close proximity to the flat interior side surface portions of the outer member.

The urethane material used as the resilient component of the coupling 10 gives the coupling excellent shock-absorbing and resilient damping characteristics, particularly in low speed-high torque applications, and is easy and relatively inexpensive to form in-place within the coupling. However, if desired, other resilient materials such as a suitably high durometer value rubber material could alternately be used.

It will be appreciated that the outer and inner members of the couplings 10 and $10_a$ can be rapidly and relatively inexpensively formed by cutting appropriate lengths from standard size, square cross-sectioned hollow steel tube and solid bar stock members that are relatively sized in cross-section to define the cavity thickness X between the inner and outer members. However, this method of constructing the inner and outer members limits the number of potential cavity thicknesses in the finished coupling to those increments available using various combinations of standard hollow tube and solid bar stock. Stated otherwise, the cavity thickness X can only be increased or decreased in discrete increments which are determined by the relative cross-sectional sizes of commercially available tube and bar stock. In many instances, this limitation does not pose a significant problem in the design of the coupling 10 since if the cavity thickness X is slightly wider or narrower than its optimum design thickness, the overall torsional resilience of the coupling may be adjusted by adjusting the overall length of the urethane therein. However, in some instances, it may be necessary to precisely control the cavity thickness X in order to precisely limit the potential amount of total relative rotation between the inner and outer coupling members. In this event, the use of standard square tube and bar stock to fashion the inner and outer coupling members necessitates a design compromise in the coupling 10.

Another limitation arising from the use of standard square tube and bar stock to form the inner and outer coupling members relates to the use of the coupling member grooves and ribs 70, $70_a$ depicted in FIG. 5. It can be seen in FIG. 5 that while the rib $70_a$ is axially aligned with the groove 70, it does not actually project into the groove. This groove and rib relationship is necessary to permit the insertion of the inner member 28 into the outer member 16 during fabrication of the coupling. While the groove and rib 70, $70_a$ cooperate to axially stiffen the coupling 10 as previously described, it can readily be seen that such axial stiffening would be significantly enhanced if the coupling could be formed so that the rib $70_a$ actually projected into the groove 70. However, this result is not easily achieved using standard tube and bar stock sections to form the inner and outer coupling members.

Figure 6:
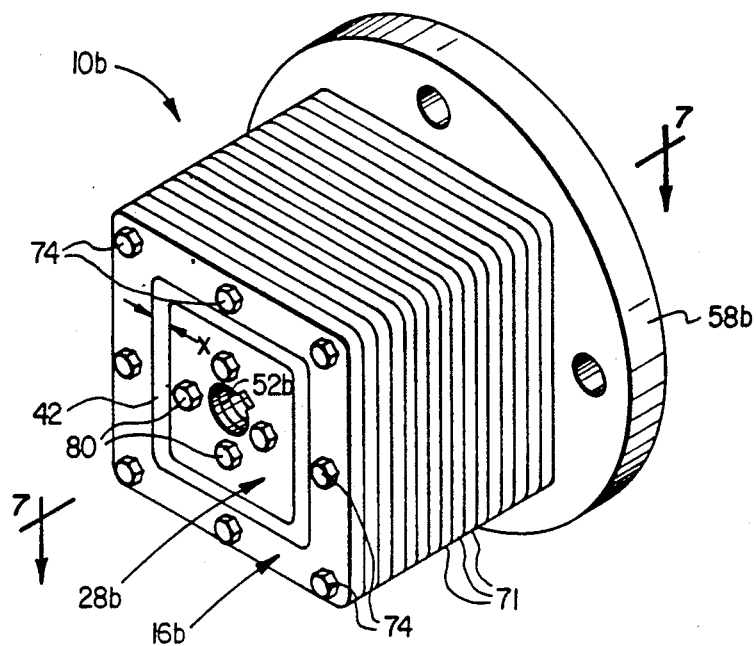
FIG. 6 is a perspective view of a further alternate embodiment of the coupling in which the inner and outer coupling members are of a laminated construction.
Figure 7:
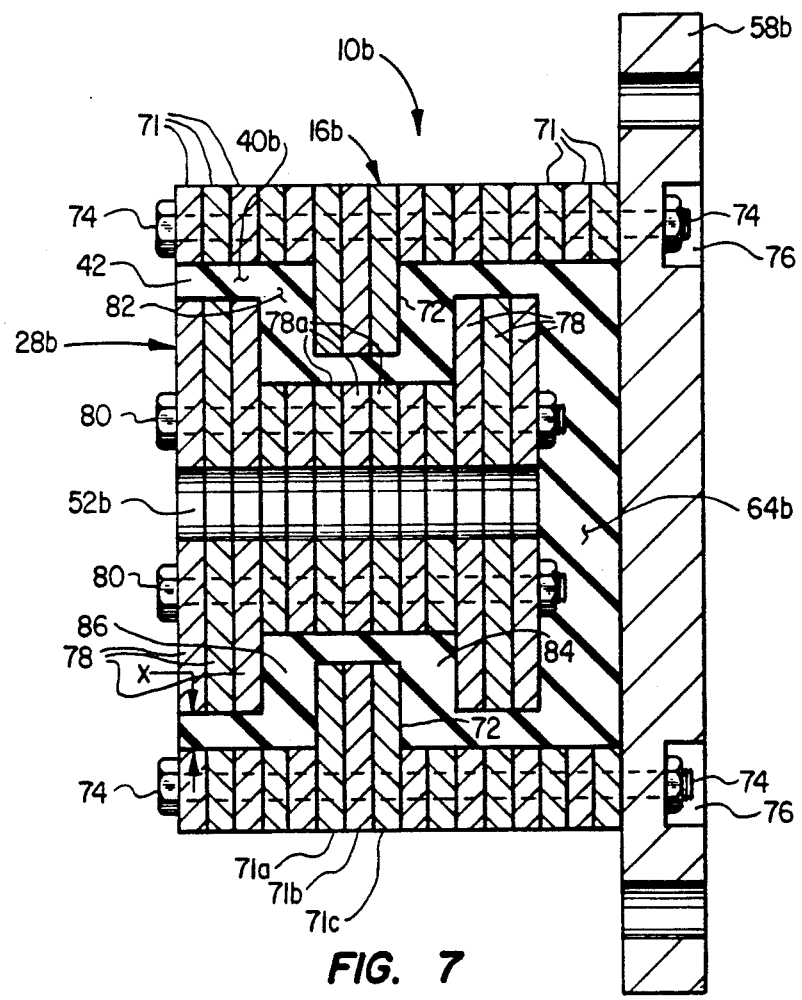
FIG. 7 is a cross-sectional view through the laminated coupling taken along line 7—7 of FIG. 6.

Though the couplings 10 and $10_a$ are quite well suited to shaft interconnection applications involving high torque transmissions together with relatively smaller axial thrust loads, there are many applications which require the coupling to withstand very high axial loads as well as high torque loads. To satisfy this design requirement, as well as providing for much greater flexibility in establishing the cavity thickness X, the present invention provides an alternate embodiment $10_b$ (FIGS. 6 and 7) of the coupling 10, the coupling $10_b$ being of a unique laminated construction which will now be described, the components of the coupling $10_b$ similar to those in the coupling 10 being given the same reference numeral, but with the subscript "b".

In the illustrated coupling $10_b$, the outer coupling member $16_b$ is formed from a series of axially stacked, hollow, square cross-sectioned laminae 71, each of which may be conveniently cut from a thick steel plate. The central openings in generally central laminae $71_a$, $71_b$ and $71_c$ are made smaller than those in the other laminae 71 so that laterally central portions of these central laminae define within the outer member $16_b$ an inwardly projecting rib portion 72 which extends around the entire inner periphery of the outer member $16_b$. The axially stacked laminae 71 are intersecured to one another by means of a series of bolts 74 which extend through suitable aligned openings in the laminae and into suitable side surface recesses 76 in the flange $58_b$, thereby bolting the laminated outer member $16_b$ to the flange $58_b$. While three central laminae have been illustrated as defining the rib portion 72, it will be appreciated that more or fewer laminae could be used if desired or necessary.

The inner coupling member $28_b$ is similarly formed from an axially stacked series of solid, square cross-sectioned laminae 78 which are intersecured to one another by means of a circular array of connecting bolts 80 which extend through suitable aligned opening in the laminae 78. Suitable central openings are formed in each of the laminae 78 to collectively define in the inner coupling member $28_b$ the keyed shaft opening $52_b$. In the inner member $28_b$ an axially central series of laminae $78_a$ are made cross-sectionally smaller than the other laminae 78 on opposite ends thereof and define around the lateral periphery of the inner member $28_b$ a rectangularly cross-sectioned notch or channel 82 which receives the inner rib portion 72 of the outer member $16_b$. It can be seen that the rib portion 72 defines with the inner member laminae 78 on opposite side thereof portions 84 and 86 of the urethane 42, one of which will be directly compressed between the rib 72 and the laminae 78 axially adjacent thereto upon relative axial movement between the inner and outer members $28_b$ and $16_b$. Specifically, if the inner member $28_b$ is moved rightwardly (as viewed in FIG. 7) relative to the outer member $16_b$, the urethane portion 86 will be placed in direct compression, while the urethane portion 84 will be placed in tension. Conversely, when inner number $28_b$ is moved leftwardly, urethane portion 84 will be placed in compression while urethane portion 86 is placed in tension. Importantly, the laminated construction of the inner and outer members $28_b$ and $16_b$ of the coupling $10_b$ permit the rib 72 to project into the channel 82 around the entire periphery of the inner member $28_b$.

This inward projection of the rib 72 into the channel 82 is conveniently achieved during the construction of the outer and inner member $16_b$ $28_b$ by progressively forming the two laminae stacks in an alternating manner such that right portions of the outer and inner member $16_b$, $28_b$ (as viewed in FIG. 7) are formed first. Next, the rib portion 72 of the outer member $16_b$ may be formed so that it is positioned leftwardly of the right fullsized laminae 78 on the inner member $28_b$. Finally, the left portions of the inner and outer laminae stacks are added and the completed stacks are bolted together. After the assembly of the inner and outer members is completed, the two members are held in proper relative orientation and the urethane 42 is poured into the cavity $40_b$ and then cured as previously described.

Instead of completely forming the laminated outer and inner members $16_b$, $28_b$ and then pouring the liquid urethane into the offset coupling cavity $40_b$, the laminated coupling $10_b$ may be alternately formed in a "modular" fashion in which longitudinally aligned pairs of outer and inner laminae 71, 78 (as viewed in FIG. 7) have urethane poured and cured therebetween to form longitudinal "modules" of the coupling, each such module comprising one inner lamina, one outer lamina and urethane filler material disposed in the longitudinal cavity portion defined therebetween. These separate modules may then be bolted together to form the illustrated laminated coupling $10_b$. The only structural difference between this coupling and the coupling illustrated in FIG. 7 would be that the urethane filler 42 in cavity $40_b$ would be comprised of longitudinal segments instead of being continuous along the length of cavity $40_b$. In certain instances this alternate laminated fabrication technique is preferable in that the urethane pouring process is significantly simplified (and somewhat easier to control) when the urethane is separately poured into a series of short, straight cavities (i.e., between the individual pairs of inner and outer laminae) instead of into the longer, offset cavity $40_b$.

The assembled coupling $10_b$ resiliently absorbs torsional shocks between the driving and driven shafts which it interconnects in a manner similar to that described in conjunction with the couplings 10 and $10_a$. Additionally, the coupling $10_b$ is able to withstand and absorb very sizable axial thrust loads, in either axial direction, due to the unique relative positioning between the inner rib 72 and the inner member channel 82.

It can also be seen that because of the unique laminated construction of the high axial strength coupling $10_b$, the urethane or cavity thickness X may be very precisely sized and is not limited to the discrete increments available if standard square tube and bar stock is utilized to form the inner and outer coupling members.

While the laminated coupling construction technique just described affords the coupling $10_b$ the ability to withstand and absorb very high axial thrust loads in either direction, it will be appreciated that this construction technique may also be utilized solely to give the coupling a more precisely predeterminable cavity thickness X. Accordingly, the laminated construction technique could be used to fabricate the coupling $10_b$ without the cooperating rib 72 and channel 82 in applications where extremely high thrust loads are not anticipated. In these instances, it is only necessary to form one of the inner and outer members as a laminated structure. For example, a solid square tube section could be used to form the outer member $16_b$ and the inner member $28_b$ could be formed from laminae having identical cross-sections but with exterior dimensions precisely determined to yield a cavity thickness X unavailable if the inner member were formed from a length of standard square bar stock. Similarly, the inner member $28_b$ could be formed from a length of standard, solid square bar stock while the outer member could be custom fabricated from individual laminae to obtain a cavity thickness X of any desired size.

It can be seen from the foregoing that the present invention provides a shock-absorbing resilient coupling which is of a simple, reliable and relatively inexpensive construction and is readily adaptable to a wide variety of torque-transmitting applications. Due to the unique cooperation between the inner and outer coupling members, which automatically limits potential rotation therebetween, the resilient component of the coupling is not subjected to significant torsional shear stress levels and the conventional problem of coupling "spin-out" is essentially eliminated. Additionally, because such resilient component is bonded to the facing surfaces of the coupling members, its entire volume is efficiently utilized to absorb and damp shock loads imposed on either of the shafts which the coupling interconnects. Particularly in its laminated version, the coupling may also be constructed to absorb and damp very high axial thrust loads between the shafts which it interconnects.

Figure 8:
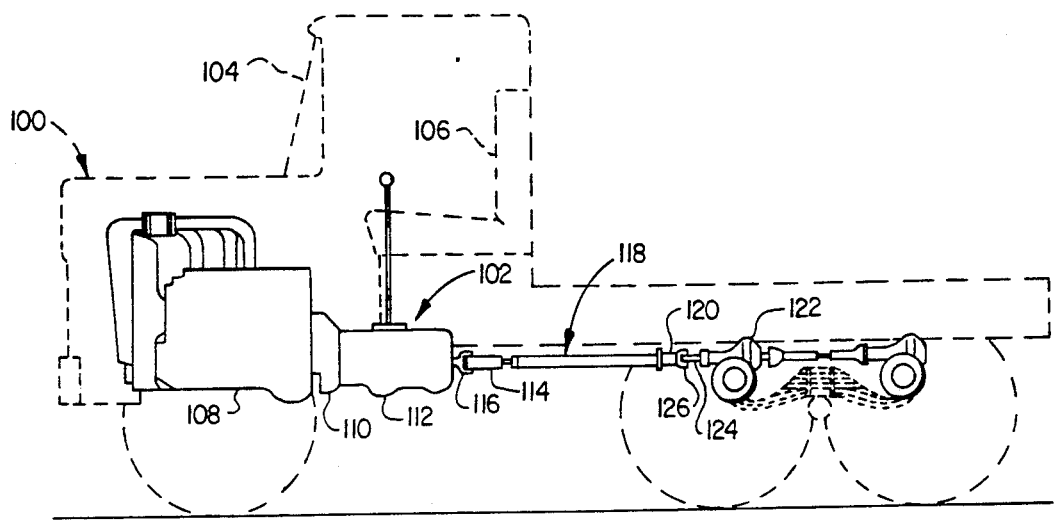
FIG. 8 is a simplified side elevational view of a diesel truck drive train which incorporates a shock-absorbing resilient coupling of the present invention, the truck being shown in phantom for illustrative purposes.

To illustrate a representative torque transmitting application of the resilient, shock-absorbing coupling of the present invention, a diesel truck 100, having a drive train is shown in FIG. 8, the truck 100 having a cab portion 104 in which a driver's seat 106 is operatively mounted. From front to rear, the drive train 102 includes: a diesel engine 108; a clutch 110; a manual transmission 112 having a hollow, internally grooved output shaft 114 connected thereto by a universal joint 116; a specially designed, balanced drive shaft section 118 incorporating a resilient, shock-absorbing coupling 120 of the present invention; and a differential structure 122 having an input shaft 124 connected to coupling 120 by a yoke-type universal joint 126.

The drive shaft section 118 drivingly interconnects the transmission output shaft 114 and the differential input shaft 124 and, in a manner subsequently described, is easily installed to replace the conventional rigid drive shaft section which normally couples these two drive train components. As will be seen, due to the unique incorporation therein of the resilient coupling 120, the drive shaft section 118 significantly improves the operation of the truck 100 in two important regards. First, it serves to absorb and damp torsional shock and vibration transmitted from the diesel engine 108 to the differential 122 via the manual transmission 112 and the interconnecting shaft structure, thereby reducing operating stresses on the rigid components of the overall drive train structure. Secondly, the drive shaft section 118 functions to significantly reduce drive train shock and vibration transmitted to the cab 104, and thus the driver's seat 106, to thereby significantly diminish driver fatigue which, to a large extent, ordinarily results from such transmitted shock and vibration.

Figure 9:
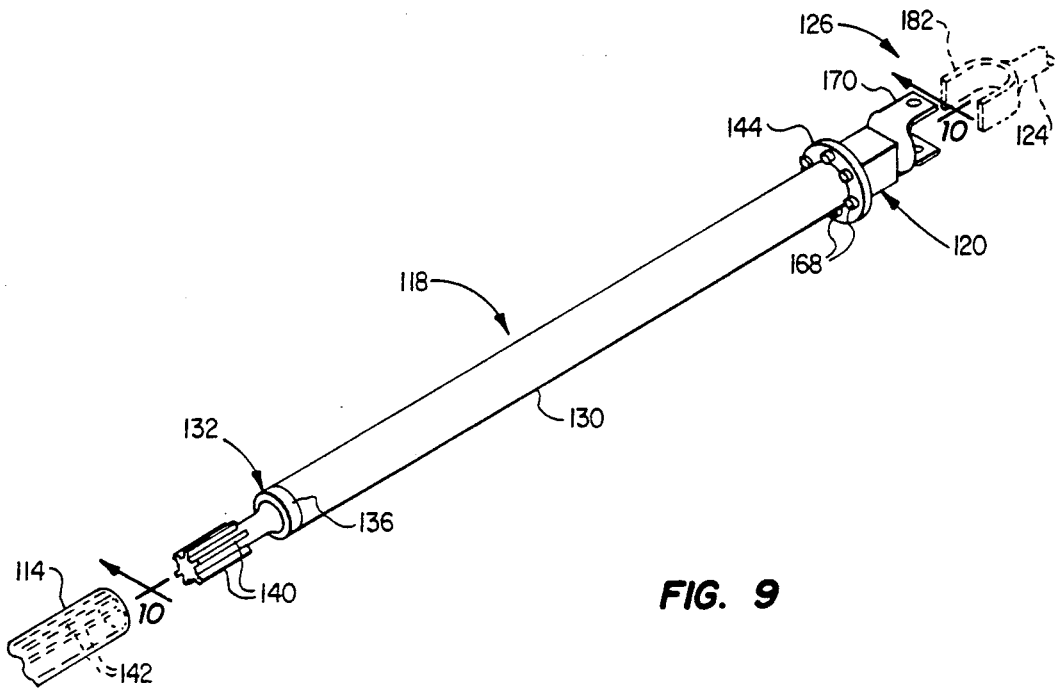
FIG. 9 is an enlarged scale partially exploded and fragmented perspective view of a removable drive shaft section upon which the coupling is mounted, and portions of the drive train, shown in phantom, to which opposite ends of the drive shaft section are connected.

Referring now to FIGS. 9 and 10, the drive shaft section 118 includes an elongated, tubular metal drive shaft 130 having a slip tube shaft 132 secured to its left end. The right end of the slip tube shaft 132 is provided with a cylindrical boss portion 134 which is received within the left end of the shaft 130, and an annular flange 136 which is welded around its periphery, as at 138, to the left end of the drive shaft 130. At its outer end, the slip tube shaft 132 is provided with a circumferentially spaced series of radially outwardly projecting splines 140 which are received by complementarily configured internal axial grooves 142 (FIG. 9) formed in the output shaft 114, thereby rotationally locking the shafts 114 and 130 but permitting axial movement of the shaft 130 relative to the output shaft 114.

Referring now to FIGS. 10 and 11, the resilient coupling 120 is secured to the right end of the drive shaft 130 and includes mounting flanges 144 and 146, a hollow, square cross-sectioned metal outer coupling member 148, and a square cross-section metal inner coupling member 150 having a circular bore 152 formed centrally therethrough. A urethane material 154 is disposed in the cavity between the outer and inner coupling members 148 and 150, and is bonded to their laterally facing inner and outer side surfaces as previously described in conjunction with the coupling 10 of FIGS. 1 and 2.

The flange 144 has a circular configuration and is provided with a cylindrical boss 156 that projects axially from a central portion of one of its side surfaces. Flange 144 is anchored to the right or rear end of drive shaft 130 by a circumferential weld 157. The opposite side surface of the flange 144 has formed thereon a peripheral rim 158 and a centrally positioned surface recess 160. Defined between the radially inner periphery of rim 158 and the periphery of the surfaced depression 160 is a circumferential flat side surface portion 162 of the flange 144.

Flange 146 is of a circular configuration having an outer diameter just slightly smaller than the radially inner diameter of the rim 158. A square central opening 164 is formed through the flange 146 and has side dimensions substantially identical to that of the surface recess 160 of flange 144. The square flange opening 164 receives a left end portion of the outer coupling member 148, the flange 146 being secured around its inner periphery to the outer coupling member 148 by a circumferential weld 166. The flange 146 abuts the circumferential flat surface 162 of flange 144 and is firmly held against such surface by a series of bolts 168 extended through peripheral portions of the flanges 144 and 146, the rim 158 serving to radially align the flange 146 relative to the flange 144. With the flanges 144, 146 interconnected in this manner the outer coupling member 148 is firmly anchored to the flange 144, and the flange surface recess 160 permits at least a limited degree of axial movement of the inner coupling member 150 relative to the outer coupling member 148, in a leftward direction as viewed in FIG. 10, and to prevent metal-to-metal contact between the inner coupling member 150 and the flange 144 during drive train operation.

The replacement drive shaft section 118 also includes a universal joint yoke member 170 which is secured to the inner coupling member 150 and projects rightwardly therefrom as viewed in FIG. 10. The yoke member 170 has a pair of apertured yoke arms 172, a centrally disposed annular shoulder 174, and a reduced diameter cylindrical boss extending leftwardly from the shoulder 174. Boss 176 is closely received within a right end portion of the circular bore 152 of inner coupling member 150 and is anchored thereto by a circumferential interior weld 178. Shoulder 174 abuts the right end of the inner coupling member 150, and is secured thereto by a circumferential weld 180. The yoke 170 is configured for connection to the existing yoke arm 182 which is left in place on the input shaft 124 after the existing drive shaft section (which, as previously described, interconnects the output shaft 114 and the input shaft 124) has been removed for replacement with the improved drive shaft section 118 of the present invention.

The drive shaft section 118 is formed in two subassemblies which are interconnected by the bolts 168. The first subassembly includes the drive shaft 130, and the slip tube shaft 132 and the flange 144 which are welded to the shaft as previously described. The second subassembly comprises the outer and inner coupling members 148 and 150, the urethane material 154 interposed between and bonded to their facing side surfaces, the flange 146 and the yoke member 170. In forming this second subassembly, the flange 146 is welded to the outer coupling member 148, and the yoke member 170 is welded to the inner coupling member 150. In a unique manner subsequently described herein, the inner coupling member 150 is then positioned and suitably held coaxially within the outer coupling member 148, and the urethane 154 is poured into the cavity between the coupling members and cured and bonded in place therebetween as previously described, one end of the cavity being suitably sealed during the urethane pouring process, also as subsequently described herein.

The mounting flange 144, as originally welded to the right end of drive shaft 130 does not have the back side surface depressions 160 and 162, such depressions being formed after the flange 144 is welded in place. This permits the surface 162 to be machined on the in-place flange 144 so that the plane of this surface 162 is very precisely transverse to the axis of shaft 130, and the resulting alignment rim 158 is precisely centered about such axis. In a similar fashion, the front side surface of the flange 146 in the second subassembly is suitably machined so that it lies in a plane which is precisely perpendicular to the rotational axis of the second subassembly. Accordingly, when the flanges 144, 146 are bolted together, to bring their facing, machined annular surfaces into abutment, the rotational axes of the first and second subassemblies are automatically aligned, an alignment facilitated by the rim 158.

Prior to connecting the two drive shaft section subassemblies, the first subassembly (elements 130, 132 and 144) is spin tested to detect rotational imbalances therein. Imbalances which are detected in this testing process are compensated for by grinding or drilling the flange 144 to remove material therefrom to bring the first subassembly into a balanced condition. The flange 146 is then operatively secured to the flange 144 using the bolts 168, and the completed drive shaft section 118 is spin tested again to check for rotational imbalances. Imbalances detected in this manner are compensated for, if necessary, by removing further material from the flange 144. In this manner, the balanced replacement drive shaft section 118 is readied for installation between the output shaft 114 and the input shaft 124 (FIG. 8) in place of the existing rigid drive shaft section which interconnects these two shaft portions of the truck's drive train. The replacement drive shaft section 118 is readily installed in the drive train simply by inserting the slip tube splines 140 into the grooves 142 in the existing output shaft 114 (FIG. 9) and then operatively connecting the universal joint yoke members 170 and 182.

Figure 12A:
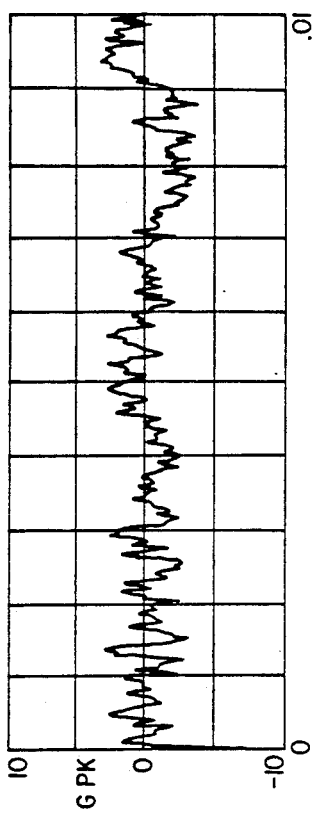
FIG. 12A is a graph similar to that in FIG. 12, but illustrating the significant transmission vibration reduction achieved using the drive shaft section of FIG. 9.
Figure 12:
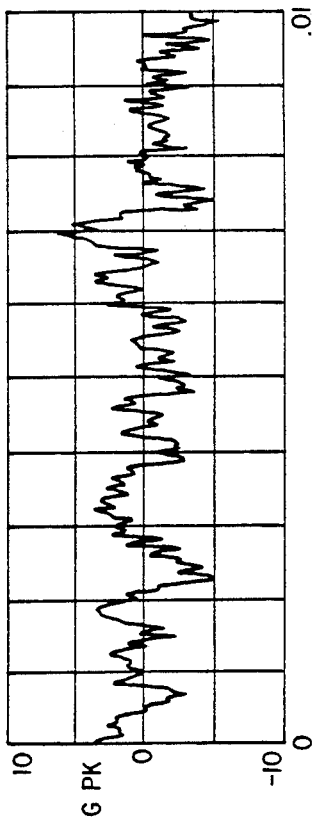
FIG. 12 is a graph illustrating the vertical vibration characteristics of the truck's transmission with a conventional drive train in place.
Figure 13A:
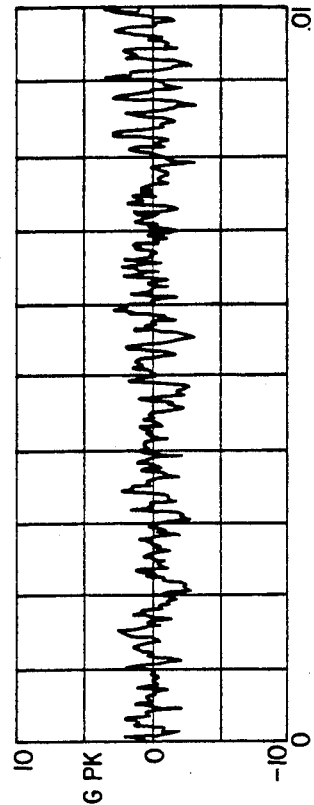
FIG. 13A is a graph similar to that in FIG. 13, but illustrating the significant differential vibration reduction achieved using the drive shaft section of FIG. 9.
Figure 13:
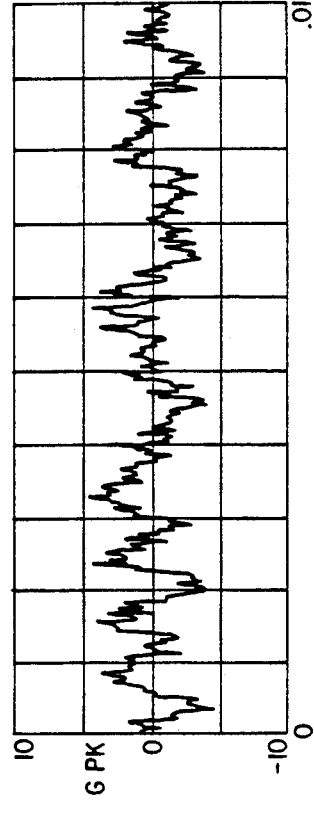
FIG. 13 is a graph illustrating the vertical vibration characteristics of the truck's differential section with a conventional drive train in place.

To demonstrate the torsional shock and vibration damping characteristics of the resilient drive shaft section 118, the truck 100 (a Mack truck with a 300 H.P. diesel engine and a six speed manual transmission) was operatively connected to a chassis dynamometer, and piezoelectric accelerometers were operatively connected to the transmission 112 and the differential 122 to measure the vertical acceleration, as a function of time, of these two drive train components during truck operation. With the conventional rigid drive shaft section in place between the output and input shafts 116 and 124, the engine 108 and transmission 112 were operated to provide a simulated truck road speed of approximately 47 MPH. Plotted on the graphs of FIGS. 12 and 13, respectively, are the resulting vertical vibratory accelerations of the transmission 112 and the differential 122.

Next, the conventional rigid drive shaft section was removed and replaced with the improved drive shaft section 118 of the present invention. The graphs in FIGS. 12A and 13A, respectively, illustrate the vertical vibrational acceleration of the transmission 112 and the differential 122 when the truck was again brought to a simulated road speed of approximately 47 MPH. It can be seen from FIGS. 12A and 13A that the resilient drive shaft section 118 provides a very substantial reduction in drive train rotational shock and vibration compared to the rigid drive shaft section which it is designed to replace.

The large reduction in drive train rotational shock and vibration, which is easily and economically achieved using the drive shaft section 18 provides the truck with two primary operating advantages over a truck with a conventional, rotationally rigid drive train. First, it advantageously reduces the rotational shock and vibrational stresses imposed on the rigid drive train components, thereby prolonging their operating lives. Second, and quite importantly, it greatly reduces the rotational shock and vibration transmitted to the seat 106 and thus to the driver of the truck. This, in turn, significantly reduces driver fatigue and renders the truck safer and more comfortable to drive.

Referring now to FIGS. 14–17, the overall balance of the replacement drive shaft section 118 is significantly improved using a unique fabrication process for the resilient coupling end thereof as will now be described. As will be seen, the process utilizes a specially designed alignment and sealing device 200 (FIGS. 16 and 17) which functions to precisely position and align the outer and inner coupling members 148 and 150 prior to the pouring of the urethane 154 in the cavity therebetween.

Figure 14:
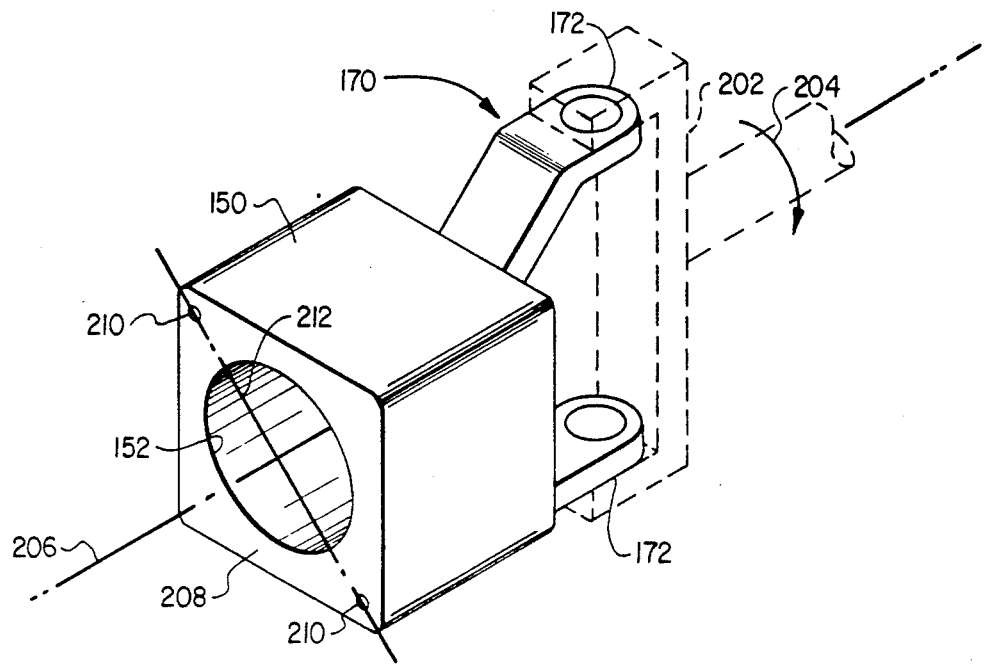
FIG. 14 is a perspective view, partially in phantom, of the inner coupling member and yoke arm subassembly being prepared for connection to the outer coupling member.

In fabricating the resilient coupling end of the drive shaft section 118, the yoke boss 176 is pressed into the central opening 152 of the inner coupling member 150, the axes of the inner coupling member 150 and the yoke member 170 are trued, and the welds 170 and 180 are formed to anchor the yoke member to the inner coupling member. As illustrated in FIG. 14, the yoke arms 172 are then secured to a suitable chuck member 202 which is rotated as indicated by the arrow 204 to rotate the inner coupling member 150 about its axis 206. During rotation of the inner coupling member 150 in this manner, its end face 208 is machined to be precisely perpendicular to the axis 206. After this machining process is completed, a pair of generally spherically curved alignment dimples 210 are formed in opposite corner portions of the inner coupling member 150, the dimples 210 being positioned on a diagonal reference line 212 which intersects the inner coupling member axis 206.

Figure 15:
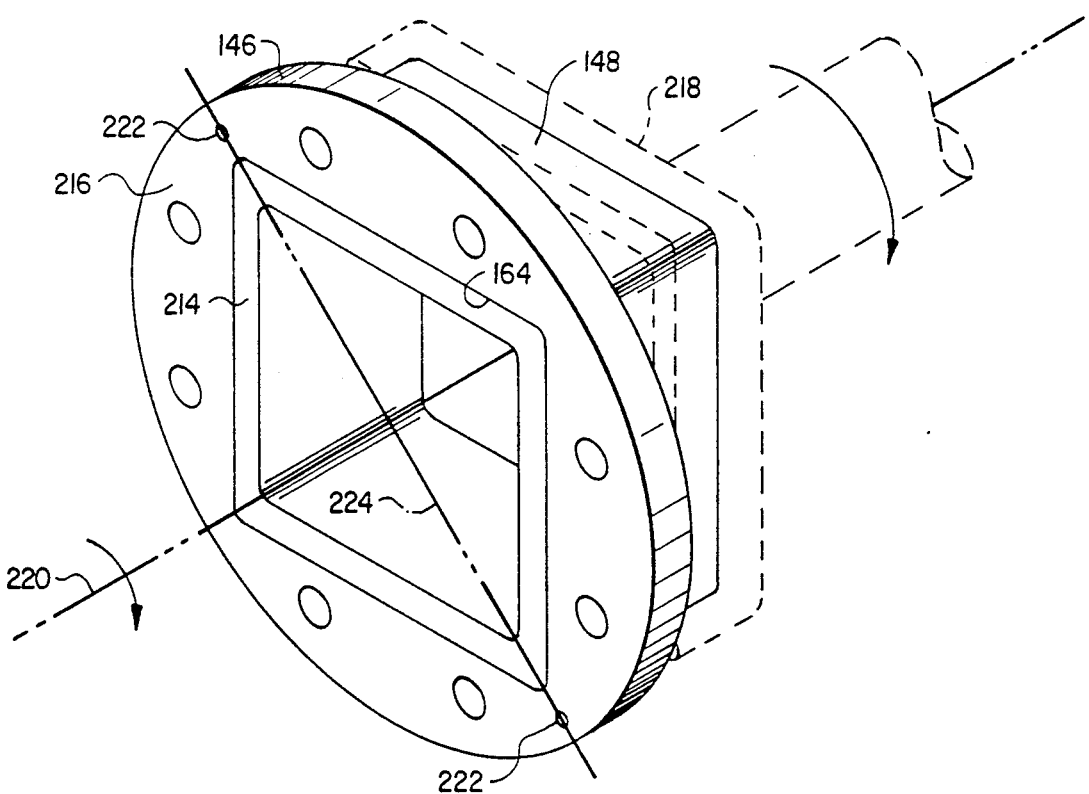
FIG. 15 is a perspective view, partially in phantom, of the outer coupling member and its associated mounting flange being prepared for connection to the inner coupling member.

The outer coupling member 148, and its associated mounting flange 146, are assembled in much the same manner. The outer coupling member 148 is inserted into the square opening 164 (FIG. 15) of the flange 146 until the end surface 214 of the outer coupling member 148 is generally flush with the side surface 216 of the flange 146, the axis of the outer coupling member 148 and the flange 146 are trued, and the weld 166 (FIG. 10) is formed to anchor the mounting flange 146 to the outer coupling member 148. Next, as illustrated in FIG. 15, the outer coupling member 148 is secured within a suitable chuck device 218 and is rotated about the axis 220 of the outer coupling member 148. The outer coupling member end surface 214 and the outer flange side surface 216 are then machined to be coplanar and precisely perpendicular to the outer coupling member axis 220. Alignment dimples 222 similar to the previously described dimples 210 in the inner coupling member 150 are then formed in the flange side surface 216. The dimples 222 are positioned along a diagonal reference line 224 which passes through opposite corner portions of the outer coupling member end surface 214 and intersects the axis 220.

Figure 16:
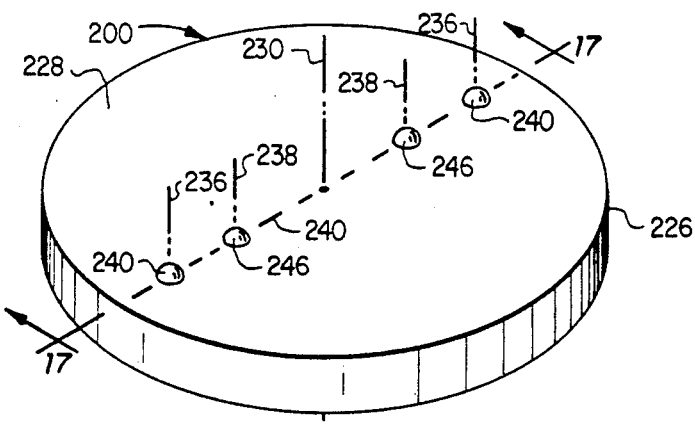
FIG. 16 is a perspective view of a specially designed alignment and sealing device used to precisely align and sealingly support the coupling subassemblies depicted in FIGS. 14 and 15 prior to and during the in-place pouring of liquid urethane into the cavity between the inner and outer coupling members.
Figure 17:
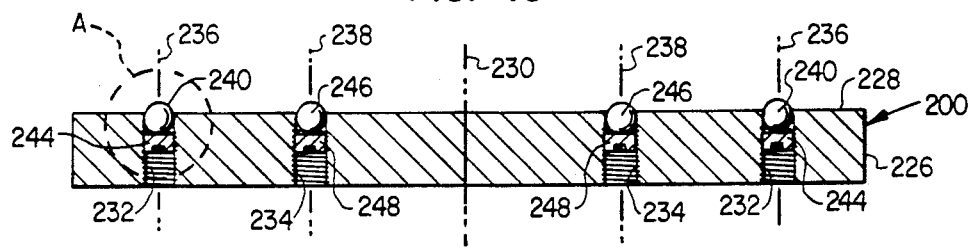
FIG. 17 is an enlarged scale cross-sectional view through the alignment and sealing device taken along line 17—17 of FIG. 16.

Referring now to FIG. 16 and 17, the alignment and sealing device 200 comprises a generally disc-shaped alignment plate member 226 having an upper side surface 228, a central axis 230 precisely perpendicular to the upper side surface 228, a pair of internally threaded outer bores 232 and a pair of internally threaded inner bores 234 extending transversely through the plate along axes 236 and 238, respectively. As best illustrated in FIG. 16, the bores 236 and 238 are positioned along a diametrical reference line 240 extending through the central plate axis 230, the axes 236 being positioned radially outwardly of the axes 238.

Figures 17A, 17B:
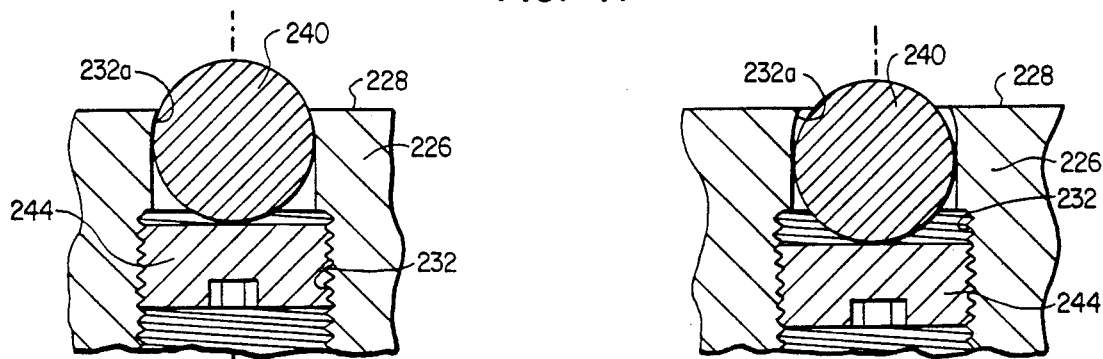
FIG. 17A is an enlargement of the circled portion "A" in FIG. 17 and illustrates a vertically adjustable alignment ball portion of the device.
FIG. 17B is a view similar to that in FIG. 17A, but with the illustrated alignment ball adjusted downwardly.

A pair of engagement members in the form of alignment balls 240 are carried in upper end portions of the threaded bores 232 (see FIG. 17A) for vertical movement within the bores. The balls 240 rest upon Allen-type set screws 244 threadedly received in the bores 232. By comparing FIGS. 17A and 17B it can be seen that by upwardly advancing or downwardly retracting one of the set screws 244, the upward projection of its associated alignment ball 240 beyond the upper plate surface 228 may be selectively adjusted. The upper ends 232$_a$ of the bores 232 taper radially inwardly as illustrated to captively retain the balls 240 in their bores 232 and limit the upward projection of the balls 240 beyond the upper plate surface 228. Alignment balls 246 are similarly positioned in upper end portions of the threaded bores 234 and are vertically adjustable therein by means of set screws 248 threadingly received in the bores 234. As can best be seen in FIG. 16, the balls 240 are positioned adjacent the periphery of the alignment plate 226, and the balls 246 are positioned radially inwardly of the balls 240.

Figure 18:
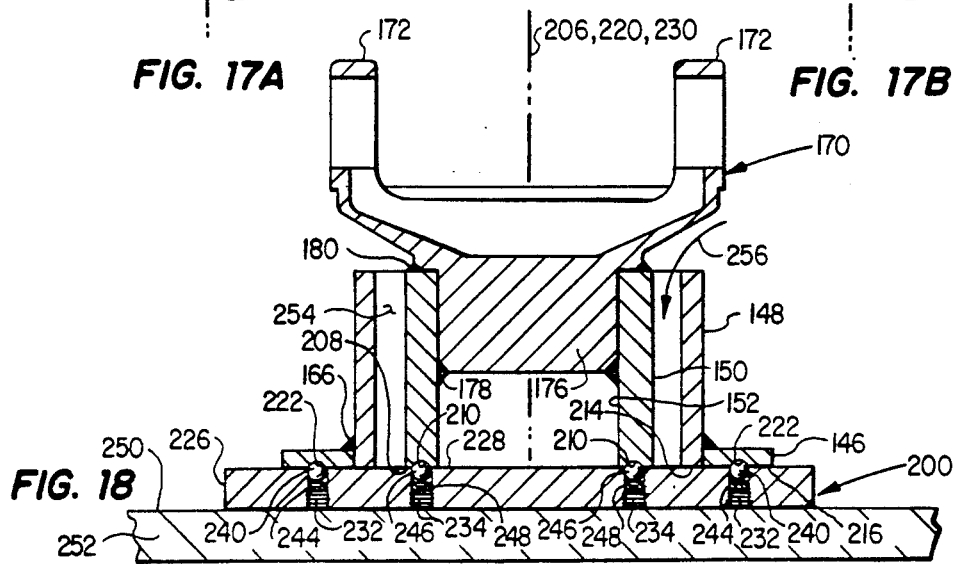
FIG. 18 is a cross-sectional view illustrating the use of the alignment and sealing device in conjunction with the coupling subassemblies of FIG. 14 and 15.

Referring now to FIG. 18, the alignment and sealing device 200 is prepared for use by appropriately adjusting the vertical projection distances of the balls 240 and 246 beyond the upper plate surface 228 using the set screws 244 and 248. The alignment plate member 226 is then rested atop the horizontal upper side surface 250 of a support table 252 or the like with the plate side surface 228 facing upwardly as illustrated. The mounting flange side surface 216 is then placed on the upper plate surface 228 so that the outer alignment balls 240 are received in the flange alignment dimples 222. With appropriate vertical adjustment of the outer alignment balls 240, their receipt in the alignment dimples 222 precisely aligns the plate axis 230 with the axis 220 of the outer coupling member 148 and brings the coupling member end surface 214 and the flange side surface 216 into a precisely parallel and abutting relationship with the upper side surface 228 of the alignment plate member 226.

The inner coupling member 150 is then positioned within the outer coupling member 148 so that the inner alignment balls 246 are received in the alignment dimples 210 formed in the end surface 208 of the inner coupling member. The receipt of the balls 246 in the alignment dimples 210 brings the axis 206 of the inner coupling member 150 into precise alignment with the already aligned axes 220, 230 of the outer coupling member 148 and the alignment plate 226. It also positions the inner coupling member end surface 208 in a precisely parallel and abutting relationship with the upper side surface 228 of the plate 226, the inner and outer coupling members supported in this aligned orientation defining therebetween the cavity 254. The intimate, parallel contact between the upper plate surface 228 and the coupling surfaces 208, 214 and 216 forms a convenient peripheral seal around the bottom end of the cavity 254.

With the coupling components supported on the upper alignment plate surface 228 as depicted in FIG. 18, the urethane 154 (FIG. 10) is poured in a liquid state into the upper end of the coupling cavity 254 as indicated by the arrow 256. After the urethane has hardened and been cured, the second subassembly (i.e., the elements 146, 148, 150 and 170) is removed from the plate 226 and again positioned in the chuck 218 (FIG. 15). A final facing operation is then performed on the flange side surface 216, and the perihpery of the coupling flange 146 is subjected to a final turning operation.

After the first subassembly (i.e., the shaft 130, the slip tube shaft 132 and the flange 144) has been fabricated, and the facing operation has been performed on the flange 144, the first and second subassemblies are bolted together as depicted in FIG. 10. The facing operation performed on the flange 144 includes machining the side surface 162 of its circular side recess 160 to be precisely perpendicular to the axis of drive shaft 130. Accordingly, when the flanges 144 and 146 are bolted together as indicated, the axes of the first and second subassemblies are precisely aligned due to the contact between the abutting flange side surfaces 162 and 216, and the contact between the periphery of flange 146 and the inner side surface of the flange rim 158.

Finally, the assembled drive shaft replacement section 118 is spin balanced, and any residual imbalance in the completed assembly is appropriately corrected for. The overall fabrication and alignment process just described provides the completed assembly 118 with a very high degree of operational balance while at the same time provides for very convenient incorporation in the assembly of the previously described resilient coupling member 120.

The foregoing detailed description is to be clearly understood as being given by way of illustration and example only, the spirit and scope of the present invention being limited solely by the appended claims.

What is claimed is:

1. A torque transmitting coupling having a high torque to speed range suitable for use in the drive train of a diesel engined truck or the like comprising:
   an hollow first member having a polygonally shaped interior surface concentrically disposed about an axis of rotation;
   an interior second member disposed coaxially with the axis of rotation of the hollow member and having a similarly shaped polygonal exterior surface concentrically disposed about the axis of rotation within the interior surface to form an annular cavity such that the first and second members can rotate to a limited degree one relative to the other before contacting;
   first means associated with the hollow first member and second means associated with the interior second member for connecting the coupling in a torque transmitting application; and
   a substantially incompressible yet flowable resilient material disposed within the annular cavity and being bonded at the interfaces with both the interior surface and the exterior surface with sufficient tenacity to remain bonded to both throughout the intended life of the coupling when the coupling is employed for its intended use, the resilient material having an unstressed shape when no torque is being transmitted through the coupling and being deformed by torque applied to the coupling, the deformation occurring as the result of bulk material flow resulting from the change in shape of the annular cavity, the material exhibiting a tendency to return to the unstressed shape when the torque is reduced, the resilient material exhibiting a bulk damping characteristic which resists material flow as the stress is both increased and decreased whereby when the coupling is subjected to vibratory torque loads, which produces alternate relative directions of rotation between the members, the resilient material will be deformed to greater and lesser degrees and the vibratory loads will be dampened in both relative rotational directions as a result of the bonded interfaces between the material and the first and second members.

2. The coupling of claim 1 wherein:
each of said interior surfaces of said first member and said portion of said second member has an essentially square cross-section.

3. The coupling of claim 1 wherein:
said resilient material is a urethane material which has been poured and solidified in situ to provide the bonding to the interior and exterior surfaces.

4. The coupling of claim 1 wherein:
said first and second members are axially displaceable relative to one another; and
said coupling further comprises means for causing a portion of said resilient material to tensionally resist axial separation of said first and second members, and to compressionally resist relative axial movement of said first and second members toward one another.

5. The coupling of claim 4 wherein:
said means for causing comprise means bonding a portion of said resilient material to axially facing surfaces of said first and second members.

6. The coupling of claim 4 wherein:

said means for causing comprise axially aligned, cooperating groove and rib means formed on the laterally facing surfaces of said first member and said portion of said second member, and means bonding a portion of said resilient material to generally facing surface portions of said groove and rib means.

7. The coupling of claim 6 wherein:
said rib means extend into said groove means.

8. The coupling of claim 7 wherein:
said rib means are formed on the interior surface of said first member.

9. The coupling of claim 6 wherein:
at least one of said first and second members is formed from intersecured, axially stacked laminae, at least one of said laminae defining one of said rib and groove means.

10. The coupling of claim 1 wherein:
at least one of said first and second members is formed from intersecured, axially stacked laminae.

11. A shock-absorbing resilient coupling for interconnecting driving and driven shafts, comprising:
(a) a hollow outer member operatively connectable to one of said shafts and having an interior side surface portion circumscribing and axis;
(b) an inner member operatively connectable to the other of said shafts and having an exterior side surface portion, said inner member extending axially into the interior of said outer member so that said interior and exterior side surface portions are in a facing, spaced relationship and define therebetween a cavity which circumscribes said exterior side surface portion of said inner member,
said interior and exterior side surface portions having similar convex polygonal cross-sections and being relatively configured to permit only a limited degree of relative rotation between said inner and outer members about said axis; and
(c) a resilient, flowable and essentially incompressible material exhibiting bulk resistance to flow to provide damping disposed in said cavity and being fixedly bonded to both said interior and exterior side surface portions, whereby a relative rotational displacement between said inner and outer members about said axis is resiliently resisted by flow of essentially the entire bulk volume of said resilient material, and vibrating torque loads will be damped in both directions of relative rotation of the driving and driven shafts as a result of the bonded interfaces between the material and both said interior and exterior side surface portions.

12. The coupling of claim 11 wherein:
said resilient material is a urethane material.

13. The coupling of claim 11 wherein:
said side surface cross-sections of said inner and outer members are essentially square.

14. The coupling of claim 11 wherein:
said resilient material is a solidified urethane material formed n place within said cavity.

15. The coupling of claim 11 wherein:
at least one of said inner and outer members has a mounting flange operatively secured to an end portion thereof.

16. The coupling of claim 11 wherein:
each of said inner and outer members has a mounting flange operatively secured to an end portion thereof.

17. The coupling of claim 11 wherein:
said mounting flange defines with an inner end surface of said inner member an end cavity within said outer member, and
a portion of said resilient material extends into said end cavity and is bonded to said inner end surface of said inner member and an inner end surface of said mounting flange.

18. The coupling of claim 11 wherein:
one of said inner and outer members has an axially extending opening therein adapted to nonrotatably receive an end portion of one of said shafts.

19. The coupling of claim 18 wherein:
said axially extending opening is formed in said inner member.

20. The coupling of claim 11 further comprising:
means defining a lateral offset in said cavity.

21. The coupling of claim 20 wherein:
said means defining a lateral offset in said cavity comprise a groove formed in one of said inner and outer members, and a rib formed in the other of said inner and outer members and being axially aligned with said groove.

22. The coupling of claim 21 wherein:
said groove is formed in said inner member.

23. The coupling of claim 21 wherein:
at least one of said inner and outer members is formed from intersecured, axially stacked lamine.

24. The coupling of claim 23 wherein:
said rib means extend into said groove means.

25. The coupling of claim 11 wherein:
at least one of said inner and outer members is formed from intersecured, axially stacked laminae.

26. A shock absorbing, torque transmitting coupling comprising:
a hollow first rigid member circumscribing and extending along an axis, said first rigid member having an interior side surface of a generally convex polygonal configuration defined by interconnected, essentially planar interior side surface portions;
a second rigid member having a portion coaxially disposed within the interior of said first rigid member,
said second rigid member portion having an exterior side surface which is spaced laterally inwardly from said interior side surface of said first rigid member to define therebetween an axially extending cavity disposed within said coupling,
said exterior side surface of said second rigid member portion having a convex polygonal configuration defined by essentially planar exterior side surface portions equal in number to that is interior side surface portions of said first right member and being interconnected at corner portions,
said first and second rigid members being relatively rotatable by a drive torque about said axis between a first relative angular position in which each of said exterior side surface portions is parallel to, opposes, and is spaced laterally inwardly from a corresponding interior side surface portion of said first rigid member; and
a resilient damping material disposed in said cavity for resiliently resisting relative rotation of said first and second rigid members about said axis from said first relative angular position toward said second relative angular position, said shock absorbing material being flowable under pressure, but essentially incompressible, and being fixedly bonded to both of said exterior and interior side surfaces, said material exhibiting a bulk resistance to flow in all directions to provide damping of vibratory torque loads superimposed on the drive torque as a result of the material being bonded to both rigid members.

27. The coupling of claim 26 wherein:
said shock absorbing material is a urethane material.

28. The coupling of claim 26 wherein:
said shock absorbing material is formed and bonded in situ within said cavity.

29. The coupling of claim 28 wherein:
said shock absorbing material is a urethane material.

30. The coupling of claim 26 wherein:
each of said exterior and interior side surfaces has, along its axial length, a generally square configuration.

31. The coupling of claim 30 wherein:
each of said corner portions is rounded.

32. The coupling of claim 26 wherein:
said shock absorbing material extends essentially continuously around said second rigid member exterior side surface 33. The coupling of claim 26 wherein:
said corner portions and said interior side surface portions cooperatively interfere when said first and second rigid members are in said second relative angular position to preclude further relative rotation of said first and second rigid members about said axis past said second relative angular position.

34. For use in replacing a drive shaft section removably connected between a transmission output shaft and a first universal joint yoke arm in a motor vehicle, a balanced, torsionally resilient replacement drive shaft assembly comprising:
a drive shaft having front and rear ends;
means anchored to said front end of said drive shaft for removably coupling it to said transmission output shaft;
a first mounting flange anchored to said rear end of said drive shaft;
a resilient, shock absorbing coupling projecting rearwardly from said first mounting flange and including:
a hollow, rigid outer coupling member having an interior side surface with a convex polygonal configuration,
a rigid inner coupling member coaxially disposed with said outer coupling member and having an outer side surface which has a convex polygonal shape similar to but smaller than that of said interior side surface of said outer coupling member and defining therewith a cavity that laterally circumscribes said inner coupling member, and
a substantially incompressible yet flowable resilient material disposed within the annular cavity and being bonded at the interfaces with both the interior surface and the exterior surface with sufficient tenacity to remain bonded to both throughout the intended life of the coupling when the coupling is employed for its intended use, the resilient material having an unstressed shape when no torque is being transmitted through the coupling and being deformed by torque applied to the coupling, the deformation occurring as the result of bulk material flow resulting from the change in shape of the annular cavity, the material exhibiting a tendency to return to the unstressed shape when the torque is reduced, the resilient material exhibiting a bulk damping characteristic which resists material flow as the stress is both increased and decreased whereby when the coupling is subjected to vibratory torque loads, resulting in alternate relative directions of rotation between the members, the resilient material will be deformed to greater and lesser degrees and the vibratory loads will be dampened in both relative rotational directions as a result of the bonded interfaces between the material and the first and second members;
means for removably securing one of said outer and inner coupling members to said first mounting flange; and
a second universal joint yoke arm anchored to the other of said outer and inner coupling members, projecting rearwardly therefrom, and operatively connectable to said first universal joint yoke arm.

35. The replacement drive shaft assembly of claim 34 wherein:
said means anchored to said front end of said drive. shaft comprise a splined slip tube shaft.

36. The replacement drive shaf assembly of claim 34 wherein:
said cavity has, along its length, a square crosssection, and
said resilient shock absorbing material is a urethane material.

37. The replacement drive shaft assembly of claim 34 wherein:
said first mounting flange has a rearwardly projecting peripheral rim defining on said first mounting flange an annular rear side surface area bounded by said rim,
said means for removably securing comprise a second mounting flange anchored to a front end portion of said outer coupling member, abutting said annular rear side surface area, and radially aligned relative to said first mounting flange by said rim, and means for removably connecting said first and second mounting flanges, and
said second universal joint yoke arm is anchored to a rear end portion of said inner coupling member.

38. The replacement drive shaft assembly of claim 34 wherein:
said first mounting flange has a central depression formed in a rear side surface thereof and permitting at least a limited axial deflection of said inner coupling member relative to said outer coupling and toward said first mounting flange.

39. An improved drive train for a truck having:
a diesel engine;
a manual transmission;
a clutch operatively interconnecting said diesel engine and said manual transmission; and
a differential spaced apart from said manual transmission; the improvement comprising
rotationally resilient drive shaft means for rotationally coupling said manual transmission and said differential, said drive shaft means including:
a drive shaft member having front and rear ends,
first means for removably connecting said front end of said drive shaft member to said manual transmission,
a resilient, shock absorbing coupling projecting rearwardly from said rear end of said drive shave member and including a hollow, rigid outer coupling member having an interior side surface with a convex polygonal configuration, a rigid inner coupling member coaxially disposed within said outer coupling member and having an outer side surface which has a convex polygonal shape similar to but smaller than that of said interior side surface of said coupling member and defining therewith a cavity that laterally circumscribes said inner coupling member, and a substantially incompressible yet flowable resilient material disposed within the annular cavity and being bonded at the interfaces with both the interior surface and the exterior surface with sufficient tenacity to remain bonded to both throughout the intended life of the coupling when the coupling is employed for its intended use, the resilient material having an unstressed shape when no torque is being transmitted through the coupling and being deformed by torque applied to the coupling, the deformation occurring as the result of bulk material flow resulting from the change in shape of the annular cavity, the material exhibiting a tendency to return to the unstressed shape when the torque is reduced, the resilient material exhibiting a bulk damping characteristic which resists material flow as the stress is both increased and decreased whereby when the coupling is subjected to vibratory torque loads, resulting in alternate relative directions of rotation between the members, the resilient material will be deformed to greater and lesser degrees and the vibratory loads will be dampened in both relative rotational directions as a result of the bonded interfaces between the material and the first and second members;

second means for securing one of said outer and inner coupling members to said rear end of said drive shaft member, and third means for removably securing the other of said outer and inner coupling members to said differential.

40. The improved drive train of claim 39 wherein:
said first means include a splined slip tube shaft anchored to said front end of said drive shaft member.

41. The improved drive train of claim 39 wherein:
said second means include a first mounting flange anchored to said rear end of said drive shaft member, a second mounting flange secured to said outer coupling member, and means for removably connecting said first and second mounting flanges.

42. The improved drive train of claim 41 wherein:
said third means include a universal joint yoke arm anchored to said inner coupling member and projecting rearwardly therefrom.

43. The improved drive train of claim 39 wherein:
said shock absorbing material is a urethane material.

44. The improved drive train of claim 39 wherein:
each of said inner and outer side surfaces of said outer and inner coupling members has, along its length, an essentially square cross-section.

* * * * *

UNITED STATES PATENT AND TRADEMARK OFFICE
CERTIFICATE OF CORRECTION

PATENT NO. : 5,085,289

DATED : February 4, 1992

INVENTOR(S) : JOHN H. CHANCE

It is certified that error appears in the above-identified patent and that said Letters Patent is hereby corrected as shown below:

Col. 2, line 68, "stressinduced" should be --stress-induced--.

Col. 3, line 42, "lengths o" should be --lengths of--.

Col. 5, line 35, "FIG. 3" should be --FIG. 2A--

Col. 7, line 33, "16 as" should be --16 has--

Col. 14, line 40, insert --102,-- after "train".

Col. 21, line 25, "and axis;" should be --an axis;--

Col. 21, line 59, "formed n" should be --formed in--

Col. 22, line 47, "therebetween" should be --therewith--

Col. 22, line 61, after "corresponding" insert --one of said interior side surface portions, and a second relative angular position in which each of said exterior side surfaces portions is tilted relative to its corresponding--

Col. 23, line 24, insert --portion.-- after "surface".

Col. 23, line 50, "with" should be --within--.

Col. 24, line 25, "shaf" should be --shaft--

UNITED STATES PATENT AND TRADEMARK OFFICE
CERTIFICATE OF CORRECTION

PATENT NO. : 5,085,289

DATED : February 4, 1992

INVENTOR(S) : JOHN H. CHANCE

It is certified that error appears in the above-identified patent and that said Letters Patent is hereby corrected as shown below:

Col. 24, line 27, "crosssection" should be --cross-section--.

Col. 24, line 68, "drive shave" should be --drive shaft--.

Signed and Sealed this

Tenth Day of August, 1993

Attest:

MICHAEL K. KIRK

Attesting Officer

Acting Commissioner of Patents and Trademarks